United States Patent [19]
Lindholm

[11] Patent Number: 6,108,754
[45] Date of Patent: Aug. 22, 2000

[54] THREAD-LOCAL SYNCHRONIZATION CONSTRUCT CACHE

[75] Inventor: Timothy G. Lindholm, Palo Alto, Calif.

[73] Assignee: Sun Microsystems, Inc., Mountain View, Calif.

[21] Appl. No.: 09/053,911

[22] Filed: Apr. 2, 1998

Related U.S. Application Data

[63] Continuation-in-part of application No. 08/832,090, Apr. 3, 1997, Pat. No. 5,875,461.

[51] Int. Cl.[7] ..................................................... G06F 12/08
[52] U.S. Cl. ......................... 711/122; 711/121; 711/147; 707/103; 709/104; 709/107
[58] Field of Search .................................... 711/117, 118, 711/147, 122, 121; 709/104, 107; 707/103

[56] References Cited

U.S. PATENT DOCUMENTS

| | | | |
|---|---|---|---|
| 5,303,362 | 4/1994 | Butta, Jr. et al. | 711/121 |
| 5,684,984 | 11/1997 | Jones et al. | 707/10 |
| 5,701,470 | 12/1997 | Joy et al. | 707/103 |
| 5,706,515 | 1/1998 | Connelly et al. | 709/106 |
| 5,752,249 | 5/1998 | Macon, Jr. et al. | 707/103 |
| 5,797,004 | 8/1998 | Lindholm et al. | 395/674 |

*Primary Examiner*—Hiep T. Nguyen
*Attorney, Agent, or Firm*—McDermott, Will & Emery

[57] ABSTRACT

A method and apparatus for synchronizing objects with threads is described. To find a specific synchronization construct that is to be used to synchronize a thread with an object, a local table is first searched for data that refers to the specific synchronization. If the local table does not contain data referring to the specific synchronization construct, then a global table is used to search for the synchronization construct to be used to synchronize the object with the thread.

20 Claims, 6 Drawing Sheets

THREAD-LOCAL SYNCHRONIZATION CONSTRUCT CACHE

This is continuation-in-part of application Ser. No. 08/832,090, now U. S. Pat. No. 5,875,461, entitled "THREAD LOCAL MONITER CACHE", filed by Timothy G. Lindholm on Apr. 3, 1997 (attorney docket No. 3070-001/P2065/TJC).

FIELD OF THE INVENTION

The present invention relates generally to techniques for synchronizing objects with threads of execution, and in particular, to techniques used to manage the dynamic associations between objects and data structures used to synchronize the objects.

BACKGROUND OF THE INVENTION

Multithreading environments allow different parts of a process, known as threads, to execute concurrently. Multithreading processes may be carefully designed so that multiple threads can execute concurrently without interfering with each other unnecessarily.

In multiprocessor computer systems, threads may run in parallel on the processors that form the multiprocessor computer system. Moreover, if a program can be broken down into constituent threads, such computer systems can run the program more quickly since concurrently running threads of the same program may execute in parallel. Single processor, multitasking computer systems can also execute multiple threads of execution virtually simultaneously through the use of various resource scheduling mechanisms well known to those skilled in the art.

When multithreading programs are object-oriented, each thread of a program may independently invoke methods of objects. However, because of software constraints in the program or hardware constraints in the computer system, only a predefined number of threads may be allowed to invoke the methods of any given object at one time.

For example, an object may contain a method that accesses a shared computer resource, such as an I/O device, that can only handle one access at a time. Since concurrently running threads may concurrently seek to invoke that method of the object, access to that method of the object must be restricted to one thread at a time. When execution of a method is restricted in this manner, the object of which this method is a member is said to be "synchronized" with the thread that currently has access to the method.

In the past, various approaches have been used to synchronize an object with a thread. These include the use of synchronization constructs like mutexes, monitors, and semaphores. One approach for the management of synchronization constructs, the dynamic-association approach, is described in U.S. patent application Ser. No. 08/569,805, entitled "OBJECT SYNCHRONIZATION MODULE AND METHOD WITH REDUCED MEMORY REQUIREMENTS", filed by Timothy G. Lindholm and Jonathan Payne on Dec. 8, 1995 (attorney docket No. A-62531).

In the dynamic-association approach, synchronization constructs are associated with and disassociated with objects as needed. For example, during runtime, a thread may invoke a method of an object that requires synchronization. A synchronization construct is associated with the object if a synchronization construct has not already been associated with the object. When the thread exits the method that required synchronization of the thread with the object, and there are no other threads currently requiring synchronization with the object, the synchronization construct is disassociated with the object.

Synchronization constructs may be stored in a data structure referred to as a synchronization construct cache. Managing the association of these synchronization constructs with objects involves the use of other data structures which are also part of, or associated with, the synchronization construct cache. A hash table links an object to its associated synchronization construct. A free list contains entries identifying the synchronization constructs that are not currently associated with any object.

The operations involved in managing the association of synchronization constructs with objects require the use of data structures (i.e. the hash table, synchronization construct, and free list) that are part of the synchronization construct cache. Because the synchronization construct cache is shared by all threads, the data structure representing the synchronization construct cache is a global data structure. A reference or an update to a data structure in the synchronization construct cache may require a lock of the global data structure representing the synchronization construct cache to prevent interference to and from other concurrently executing threads that may also desire to access the data structure. A lock of a global data structure is herein referred to as a global lock. Because the synchronization construct cache is a global data structure, it may be referred to as the global synchronization construct cache.

A thread contending for a data structure globally locked by another thread is delayed until the other thread releases its global lock. Delays such as this one, which are caused by one thread contending for a data structure locked by another thread, are herein referred to as contention delays. As threads executing in a computer system increase the number of operations performed on global data structures, or the number of threads increases, contention delays can often increase to undesirable levels.

Based on the foregoing, it clearly desirable to overcome the problems associated with the prior art.

SUMMARY OF THE INVENTION

A method and apparatus for managing the association of objects and synchronization constructs used to synchronize those objects with threads is provided. According to one aspect of the invention, to find a specific synchronization construct that is associated with an object, a thread-local cache used by a thread is first searched for reference data that may refer to the specific synchronization construct. If there is no reference data referring to the specific synchronization construct in the thread-local cache, then a global data structure is searched for reference data referring to the synchronization construct associated with the object.

According to another aspect of the invention, when searching the thread-local cache for a specific synchronization construct associated with an object, an in-progress reference that is part of the thread-local cache is set to a value identifying the object (e.g. the object's unique id). An association between a synchronization construct and an object may not be terminated if the in-progress reference of any thread-local cache refers to the object. Thus, setting the in-progress reference to identify the object may prevent the termination of the association between the object and the synchronization construct associated with the object should a termination enabling event occur.

According to another aspect of the invention, the association of objects with synchronization constructs is terminated lazily through a process referred to as garbage collection. The associations are terminated to make the synchronization constructs available for associating with objects, when, for example, synchronization constructs are needed for synchronizing a thread with an object. Specifically, upon the occurrence of a termination enabling event, the garbage collection process terminates the association of objects with synchronization constructs meeting termination criteria. After performing garbage collection, reference data that may refer to any synchronization construct is set so that the reference data no longer refers to any synchronization construct (unless the reference data refers to a synchronization construct associated with an object identified by the in-progress reference of any thread-local cache). Resetting reference data in this manner ensures that, for a particular object, a thread-local cache does not contain reference data that refers to a synchronization construct whose association with the object was terminated by garbage collection.

A dirty flag is used to determine whether reference data in a thread-local cache has been modified since last performing garbage collection. If the reference data has remained unmodified since last performing garbage collection, then there is no reference data that refers to a synchronization construct whose association with an object may have been terminated by garbage collection. Thus there is no need to reset any reference data.

According to another aspect of the invention, data identifying a particular object is applied to a hash function to produce a hash value. Data associated with the hash value in a local hash table in the thread local-cache is used to access a synchronization construct. Data in the synchronization construct identifying an object is used to determine whether a synchronization construct is associated the particular object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing the association of objects with synchronization constructs used to synchronize those objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
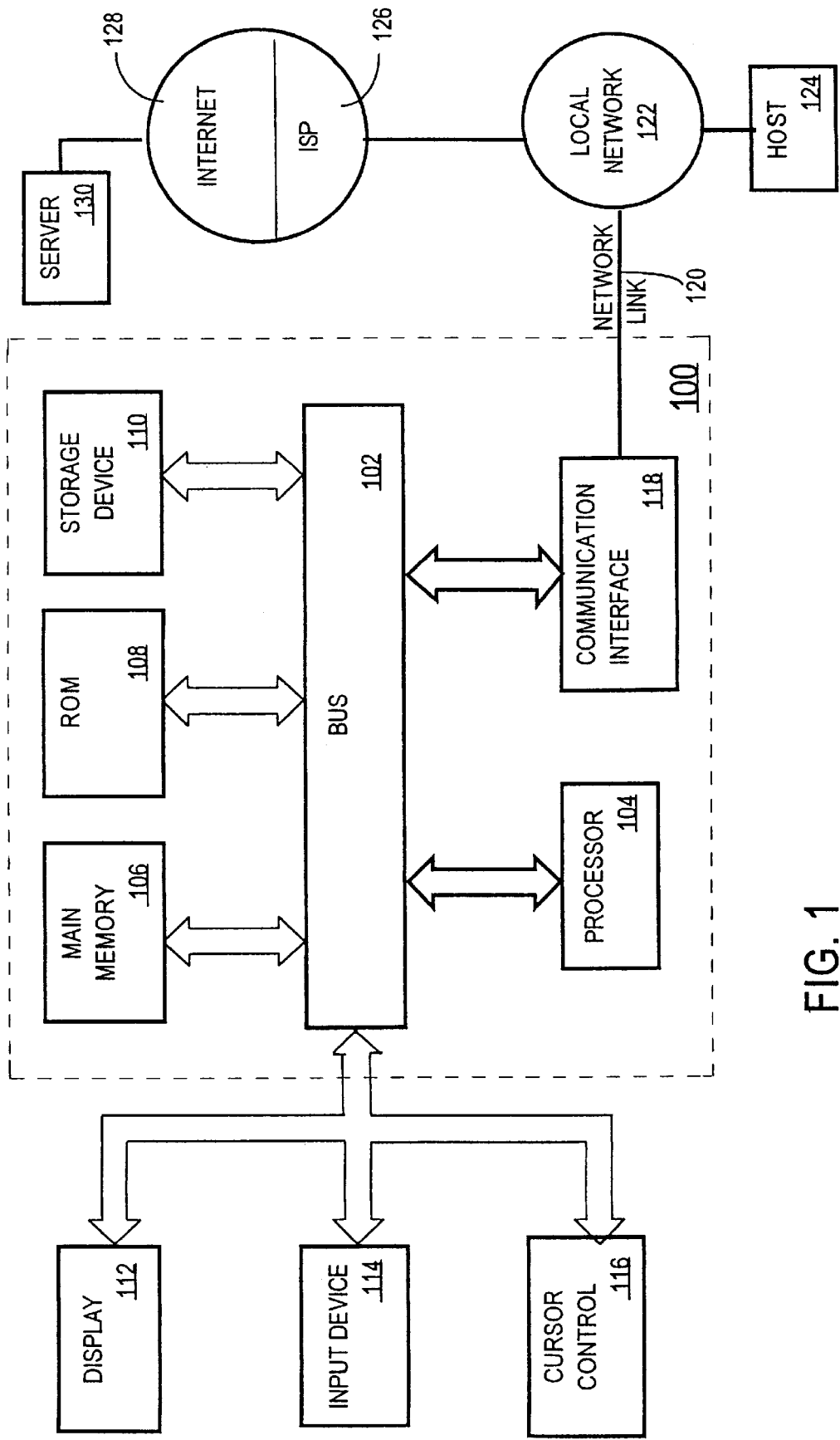
FIG. 1 is a block diagram of a computer system on which an embodiment of the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for managing the association of objects with synchronization constructs used to synchronize those objects. According to one embodiment of the invention, the management of the association of objects and synchronization constructs used to synchronize the objects is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for managing the association of objects with synchronization constructs used to synchronize those objects as described herein.

The received code may be executed by processor 104 as it is received, and/or stored in storage device 110, or other non-volatile storage for later execution. In this manner, computer system 100 may obtain application code in the form of a carrier wave.

Functional Overview

The methods described herein are used to manage the dynamic association between objects and a broad category of synchronization constructs (e.g. mutexes, monitors, semaphores) that may used to synchronize objects with threads. As described herein, one aspect of managing the dynamic association between objects and synchronization constructs involves maintaining data in a thread-local cache used by a thread. A "thread-local cache" is a data structure designated for the private use of a thread. The term cache is not used to limit the storage of the thread-local cache to any particular type of computer-readable medium. A set of one or more data structures that are part of a thread-local cache is referred to herein as a "local data structure".

The present invention advantageously manages the dynamic association between objects and synchronization constructs through the use of local data structures in thread-local cache. Data structures that are part of a thread-local cache need not be locked before the thread accesses the data structure. Thus, the overhead and contention resulting from looking-up synchronization constructs using global data structures (e.g. global hash table) that are protected by global locks is avoided.

During the course of the various operations that are performed when using synchronization constructs to synchronize an object with a thread, data in a thread-local cache is used to look up which, if any, synchronization construct is associated with a given object. In addition to being used to look-up constructs, the data in the thread-local cache may be updated. For example, one process involving the updating of data in thread-local cache is garbage collection.

A synchronization construct is referred to as being "in-use" when its current association with an object is being used to facilitate the proper functioning of some operation related to the use of the object associated with the synchronization construct. For example, a synchronization construct is in-use when the synchronization construct is being used to synchronize a thread with an object.

The association between objects and synchronization constructs may be terminated upon the occurrence of a termination enabling event. A termination enabling event is an event in response to which at least one synchronization construct is examined for the purposes of determining whether any synchronization constructs meets termination criteria. Examples of termination enabling events include a thread requesting synchronization, or the unavailability of a synchronization construct when one is needed to synchronize a thread with an object.

Termination criteria are the criteria that determine whether the association between a synchronization construct and an object can by terminated. Termination criteria can include, for example, criteria such as no thread is synchronized with the object and that no thread is waiting for synchronization with the object. Termination criteria can be based, in part, on the state of data structures associated with the synchronization constructs. As such, the termination criteria vary according to the type synchronization being used. Termination criteria are used to establish whether a synchronization construct is in-use.

When the terminations are performed "eagerly", the termination enabling event occurs relatively immediately after the synchronization construct enters a state in which it is no longer in-use. When the terminations occur "lazily", the termination event may not occur for a relatively delayed period of time after the thread enters a state in which it is no longer "in-use".

A synchronization construct that lazily remains associated with an object for a period of time may be made available for operations with another object through a mechanism described and referred to herein as garbage collection. Garbage collection may be performed upon the occurrence of a termination enabling event. When the synchronization construct's association with an object is terminated during garbage collection, the synchronization construct is made available for operations involving another object.

For purposes of illustration, the termination of an object with a synchronization construction is described with reference to an exemplary garbage collection mechanism. It should be understood, however, that the present invention is not limited to terminating the association of an object with a synchronization construct through the exemplary garbage collection mechanism described herein, nor is the present invention limited to a mechanism that performs such terminations lazily.

For purposes of exposition, the methods described herein are illustrated with reference to an exemplary set of data structures associated with synchronization constructs that indicate whether a synchronization construct is in use. In addition to these data structures, the steps for synchronizing, desynchronizing, and other operations specific to the type of synchronization are explained only in the detail necessary to the understanding of the mechanisms described herein for using thread-local cache to manage the dynamic association of synchronization constructs with objects. Those skilled in the art will recognize when the determination of the in-use state of the synchronization construct and when the operations specific to a given type of synchronization construct vary according to the type of synchronization construct being used.

Objects

Figure 2:
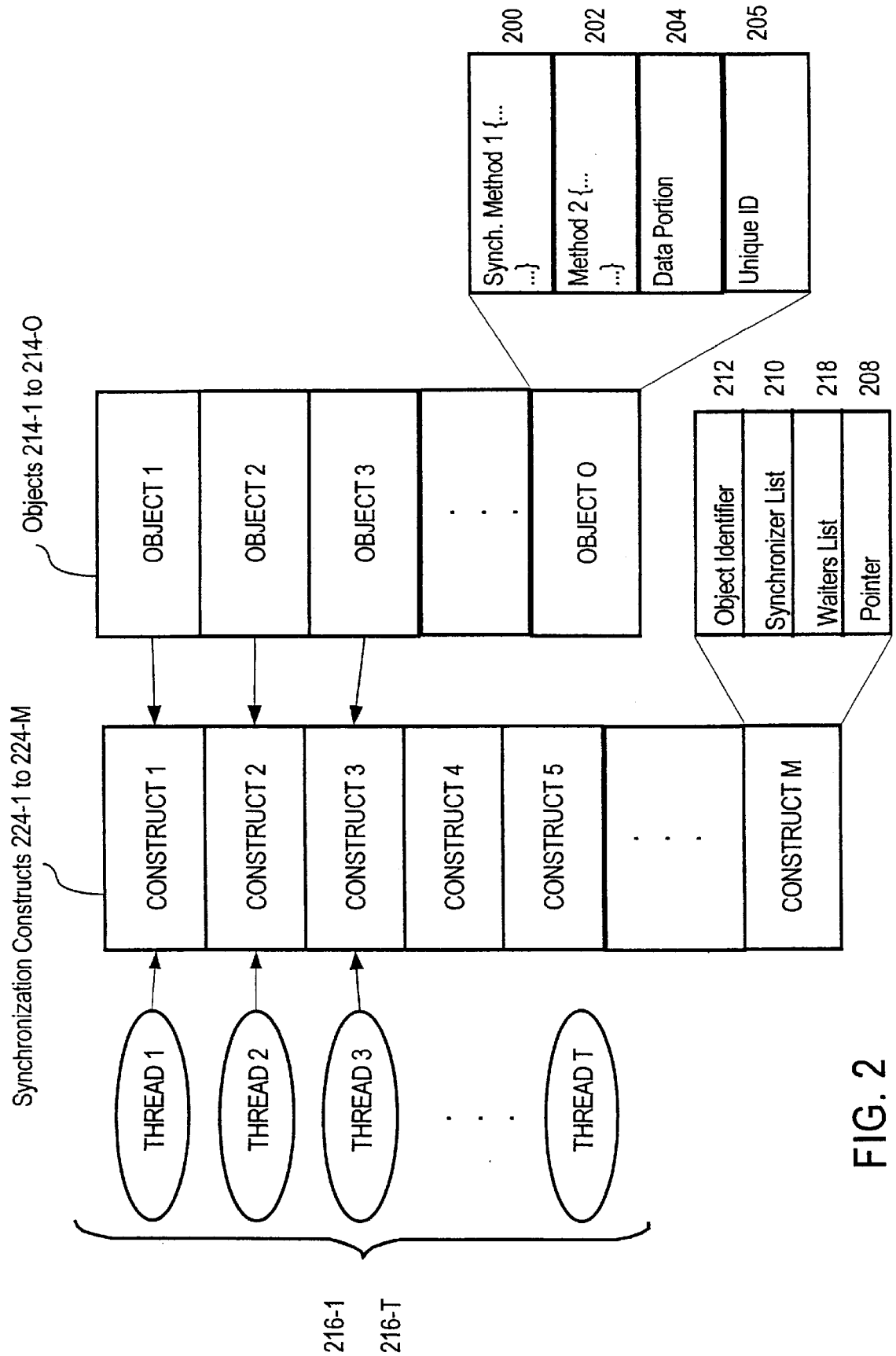
FIG. 2 is a block diagram of objects, threads, and synchronization constructs used by an object synchronization module to synchronize the objects with the threads in accordance with an embodiment of the present invention.

Referring to FIG. 2, memory 106 stores a set of objects 214. Each of objects 214 may include zero or more methods and a data portion, or zero or more methods with no data portion. For example, Object O includes one synchronized method 200, a method 202 that is not synchronized, and a data portion 204. Data portion 204 contains data and data structures associated with the Object O.

Each of objects 214 is associated with an unique ID 205. The generation of unique IDs that are associated with an object is well known to those skilled in the art.

For purposes of illustration, the objects 214 shown in FIG. 2 are generated by a JAVA™ runtime environment running on computer system 100. Typically, the JAVA™ runtime environment includes a JAVA™ virtual machine and one or more JAVA™ class files. The JAVA™ virtual machine is described in detail in "The JAVA™ Virtual Machine Specification," by Tim Lindholm and Frank Yellin (Sun Microsystems, Inc.: Addison-Wesley Publishing Co.). The byte code is generated from source code written in JAVA™ using well known compilation techniques. The JAVA™ programming language is described in detail in "The JAVA™ Language Specification," by James Gosling, Bill Joy and Guy Steele (Sun Microsystems, Inc.: Addison-Wesley Publishing Co.), and related texts in the JAVA™ Series published by Addison-Wesley.

Those skilled in the art will recognize that the methods described herein for managing the association of objects with the synchronization constructs used to synchronize those objects apply to objects implemented in any programming language or environment. Therefore the present invention is not limited to objects implemented in any particular programming language.

One synchronized method of the one or more synchronized methods associated with any particular object can be accessed by only a predefined number of threads at a time executing on computer system 100. The pre-defined number of threads that may be synchronized is assumed herein to be one. But, those skilled in the art will recognize that the methods described herein may be used to synchronize an object with more than one thread.

Synchronized methods may be explicitly declared synchronized by the object originator (i.e., programmer). When a synchronized method is invoked by a thread, the object of which that method is a member will be synchronized with that thread until the execution of the method is terminated.

Moreover, some of the objects 214 include one or more methods 202 and associated data and data structures in the data portion 204 that may be executed concurrently, without the need for synchronization, by one or more of threads 216. Thus, these methods are not synchronized and will not have been declared synchronized by the object originator.

Some of the objects 214 may contain both synchronized and non-synchronized methods 200 and 202. When one of the threads 216 invokes a method of such an object, the object is not synchronized with the thread when one of its non-synchronized methods is invoked. As a result, it will often be the case that a non-synchronized method may be executed concurrently by more than one of the threads 216, and may be executed concurrently with any number of other non-synchronized methods of the object, or concurrently with a synchronized method of the object.

Beyond having a synchronized method, there are other situations in which a thread synchronizes with an object. For example, some of the objects 214 may include methods in which only certain specific blocks of code are explicitly declared synchronized with a specified object so that the specified object will be synchronized with the thread executing this block.

While several syntactical variants for declaring sections of code (e.g. methods and blocks) synchronized have been described, other syntactical variants are possible. Moreover, in some programming languages or operating environments, a method may be synchronized without explicitly declaring the method synchronized. Therefore, it is understood that the present invention is not limited to any particular method of identifying synchronized methods.

Class methods may also be declared synchronized. A class method is invoked on behalf of the entire class, and not on behalf of a specific object belonging to that class. Threads invoking a class method that is declared synchronized synchronize with the class, rather than a specific object belonging to that class.

For purposes of illustration, only synchronization of an object that includes a method that is declared synchronized will be discussed with respect to the present invention. However, the present invention is applicable as well to objects or classes that are synchronized in other ways including those ways just discussed. Furthermore, those skilled in the art will recognize that the present invention is applicable to data structures used by other locking mechanisms, including locking mechanisms implemented for non-object oriented programming.

Exemplary Object Synchronization Module

Figure 3:
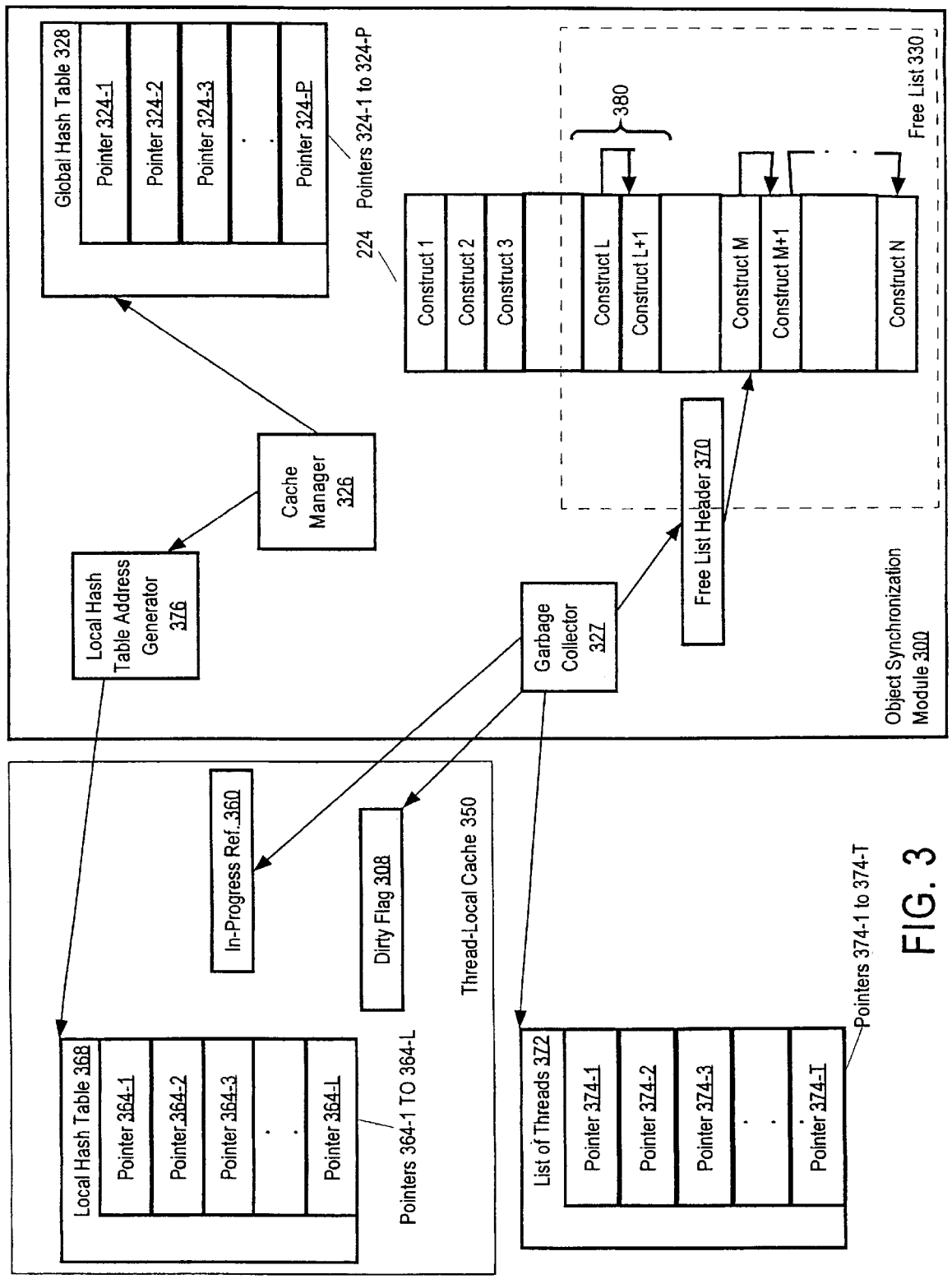
FIG. 3 is a block diagram showing modules used by the object synchronization module and the data structures used by the object synchronization module to synchronize objects with threads in accordance with an embodiment of the present invention.

FIG. 3 shows exemplary object synchronization module 300. The object synchronization module includes a cache of object synchronization constructs 224, a cache manager 326, a garbage collector 327, a global hash table 328, and a synchronization construct free list 330. Global hash table 328, and free list 330 are global data structures which must be globally locked against concurrent access before being accessed by a thread.

Referring to FIG. 2, synchronization constructs 224 are synchronization constructs used to synchronize objects 214 with threads 216. An object is associated with one synchronization construct to synchronize the object with a thread. A synchronization construct is not associated with an object until a thread requests synchronization with the object. Afterwards, the synchronization construct may remain associated with the object until the synchronization construct's association with the object is terminated in a manner which shall be described.

For purposes of exposition, each of the synchronization constructs 224 includes a exemplary synchronizers list (or owner) list 210, a waiters list 218. The exemplary synchronizers list 210 lists the thread that is currently synchronized with (or owns) the object. The waiters list 218 lists all the threads that are currently waiting to synchronize with the object to which the synchronization construct is associated.

The exemplary synchronizers list 210 and exemplary waiters list 218 are intended for illustrative purposes and not meant to be representative of an actual implementation of data structures specifically used to synchronize an object. The exemplary synchronizers list 210 and exemplary waiters list 218 are provided merely as illustrative data structures which are used by operations specific to the exemplary synchronizing and de-synchronizing described below. Furthermore, these illustrative data structures are used to provide an illustration of how data structures specific to synchronizing or desynchronizing may be used to determine whether a synchronization construct meets termination criteria. Those skilled in the art will recognize how data structures specific to a particular type of synchronization construct can be used to determine whether termination criteria is met.

Each synchronization construct also includes an object identifier 212. The object identifier 212 is set to the unique ID of the object associated with a synchronization construct.

Referring to FIG. 3, the global hash table 328 contains a set of pointers 324. The term "pointer", as used herein, generally refers to any data that is used to locate other data. Pointers may take the form, for example, of addresses that directly or indirectly indicate the location of specific pieces of data.

Each pointer is at a global hash table address. Each of the objects 214 that are to be synchronized is mapped to a corresponding address in the global hash table. This is done by computing a predetermined hash function on the unique IDs of these objects to generate the corresponding global hash table addresses. In order to keep the size of the global hash table small, the number of pointers 324 and the number of synchronization constructs 224 is less than the number of objects. However, the number of pointers 324 and the number of synchronization constructs 224 can be increased if necessary.

Because multiple unique IDs may be mapped by the global hash table function to the same global hash table address, multiple objects may be mapped to the same global hash table address. In order to properly map multiple objects to the same global hash table address, a chain of constructs 380 is provided for each global hash table address. A chain of constructs is a singly-linked list that contains zero or more synchronization constructs that are currently associated with objects whose unique IDs map to the same global hash table address. The pointer at a particular global hash table address is used to refer to the chain of constructs that contains the synchronization constructs currently associated with objects whose unique IDs map to the particular global hash table address. The manner in which the pointer refers to a chain of constructs shall be described in more detail.

A singly-linked list is a data structure that is a list representation of items in the list. Singly-linked lists, and methods used to access them and maintain them, such as methods for adding items and removing items to the singly-linked list, are well known to those skilled in the art.

Each pointer of pointers 324 illustrated in FIG. 3 serves as a list reference to a singly-linked list which is a chain of zero or more constructs. For example, pointer P in FIG. 3, is a list reference referring to the first item (construct 224-L) in an exemplary chain of constructs 380. A pointer that is referring to a data structure is herein referred to as a pointer pointing to the data structure. Typically, pointers contain memory addresses of the data structures to which the pointers point, and are used to access the data structures to which the pointer points While one method for referring to a synchronization construct has been described, various alternative methods for referring to a synchronization construct are possible. Therefore, it is understood that the present invention is not limited to a particular method for referring to a data structure. For example, Pointer M in FIG. 3 may point to a handle for a synchronization construct. The handle itself is a pointer to the synchronization construct.

Thread-Local Cache

As mentioned before, the present invention advantageously manages the dynamic association between objects and synchronization constructs through the use of local data structures in thread-local cache. Thread-local caches are assigned to threads 216. The thread-local cache assigned to a thread contains information used to refer to some of the synchronization constructs currently assigned to synchronize the thread with objects.

FIG. 3 shows the local data structures that are part of a thread-local cache of one of threads 216. Referring to FIG. 3, thread-local cache 350 contains local hash table 368 which contains a set of pointers 364. Each pointer is at a local hash table address. The set of pointers 364 are initially null when a thread-local cache is first assigned to a thread. Local hash table address generator 376 maps (or hashes) the address of each the objects 214. This is done by computing a predetermined hash function on the unique IDs of these objects to generate the corresponding local hash table addresses. In order to keep the size of local hash table 368 small in the local thread cache of each of threads 216, the number of pointers in set of pointers 364 may be less than the number of pointers in set of pointers 324. Furthermore, the unique IDs of two or more objects may be mapped by the local hash table function to the same local hash table address. As a result, local hash table collisions may occur.

Referring to FIG. 3, list of current threads 372 contains an entry associated with each of threads 216. Each entry contains a thread-local cache pointer of thread-local cache pointers 374. A thread-local cache pointer points to the thread-local cache of the thread associated with the entry in the list of current threads containing the thread-local cache pointer. A thread-local cache pointer is used to access data structures that are part of the thread-local cache assigned to the thread associated with the entry in the list of current threads containing the thread-local cache pointer.

In-progress reference 360 is a data structure that contains information identifying one object. Assigning a value to the in-progress reference 360 is an atomic operation. Thus, when a thread begins an operation to assign a value to the in-progress reference 360, the execution of the thread assigning the value cannot be interrupted by the execution of another thread until the completion of the assignment operation.

In an embodiment that uses garbage collection to terminate the association between an object and a synchronization construct, thread-local cache 350 may include a dirty flag 308. The dirty flag 308 indicates whether any thread that has made a change to local hash table 368 after the garbage collector 327 has modified the local hash table 368. For example, after a garbage collector 327 sets pointers 364 in local hash table 368 to null so that the pointers no longer refer to any synchronization construct, the dirty flag 308 is set to a first value. Subsequently, when any of the pointers is set to refer to a synchronization construct, the dirty flag is set to the second value. When the garbage collector is invoked again, if the dirty flag is still set to the first value, no pointers 364 in local hash table 368 have been set to refer to any synchronization construct, and thus no pointer 364 refers to any synchronization construct whose association with an object may have been terminated. Consequently, if the dirty flag is still set to the first value, the garbage collector may ignore the local hash table 368.

When the cache manager 326 determines which particular synchronization construct is assigned to synchronize a given thread with a particular object, if any, the cache manager 326 initially attempts to use the information contained in local hash table 368. Typically the need to determine which particular synchronization construct is assigned to synchronize a given thread with a particular object arises when, for example, object synchronization module 300 performs the steps to synchronize a thread with a particular object.

Exemplary Synchronization

An exemplary method of synchronization shall now be described with reference to FIG. 2, FIG. 3, and FIG. 4. Referring to FIG. 2, assume for example that thread 216-T invokes a synchronized method of object 214-0. Thread 216-T requests synchronization with object 214-0 by invoking object synchronization module 300.

Figure 4:
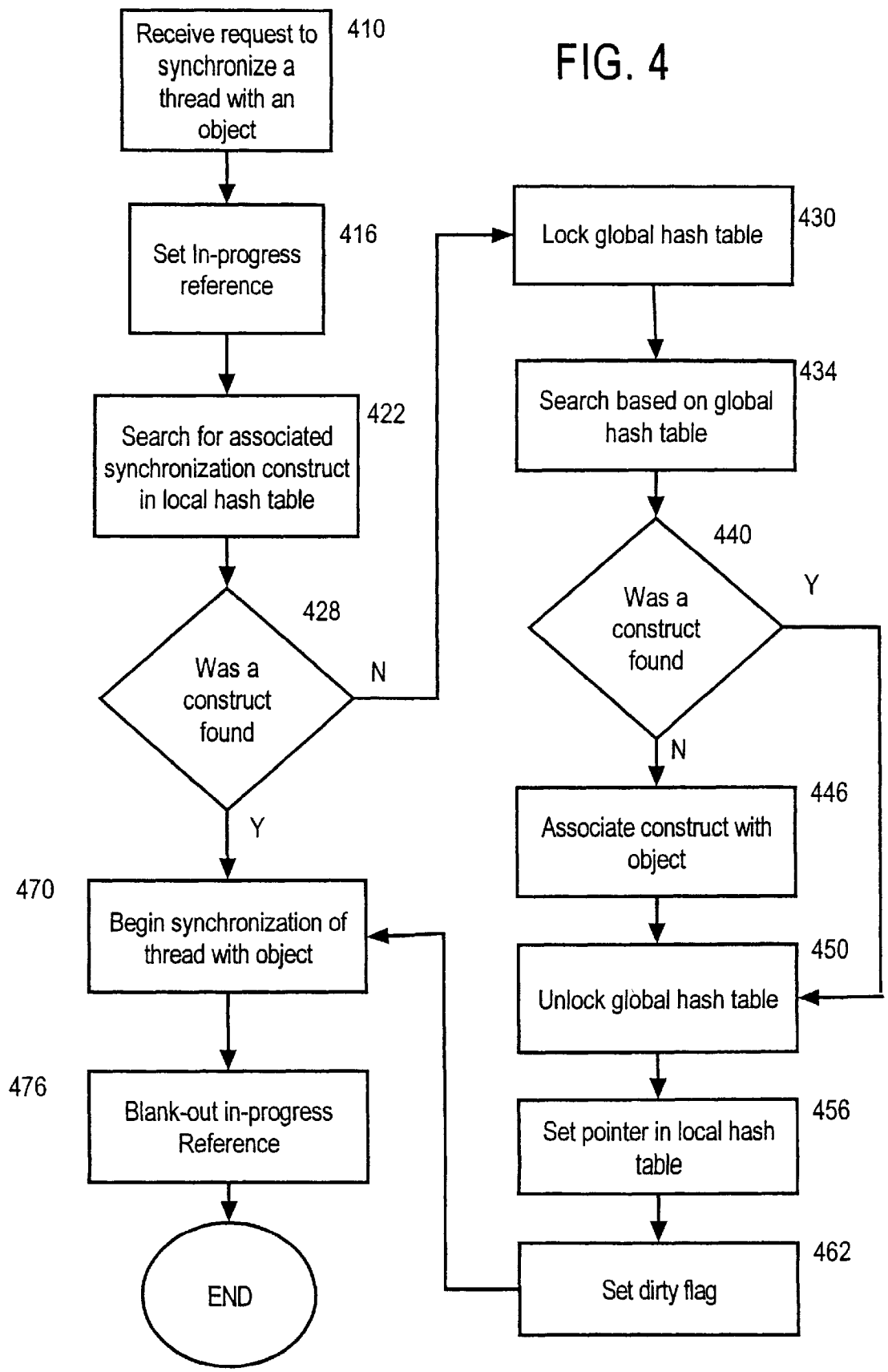
FIG. 4 is a flow chart showing steps performed when a thread requests synchronization with an object in accordance with an embodiment of the present invention.
Figure 5:
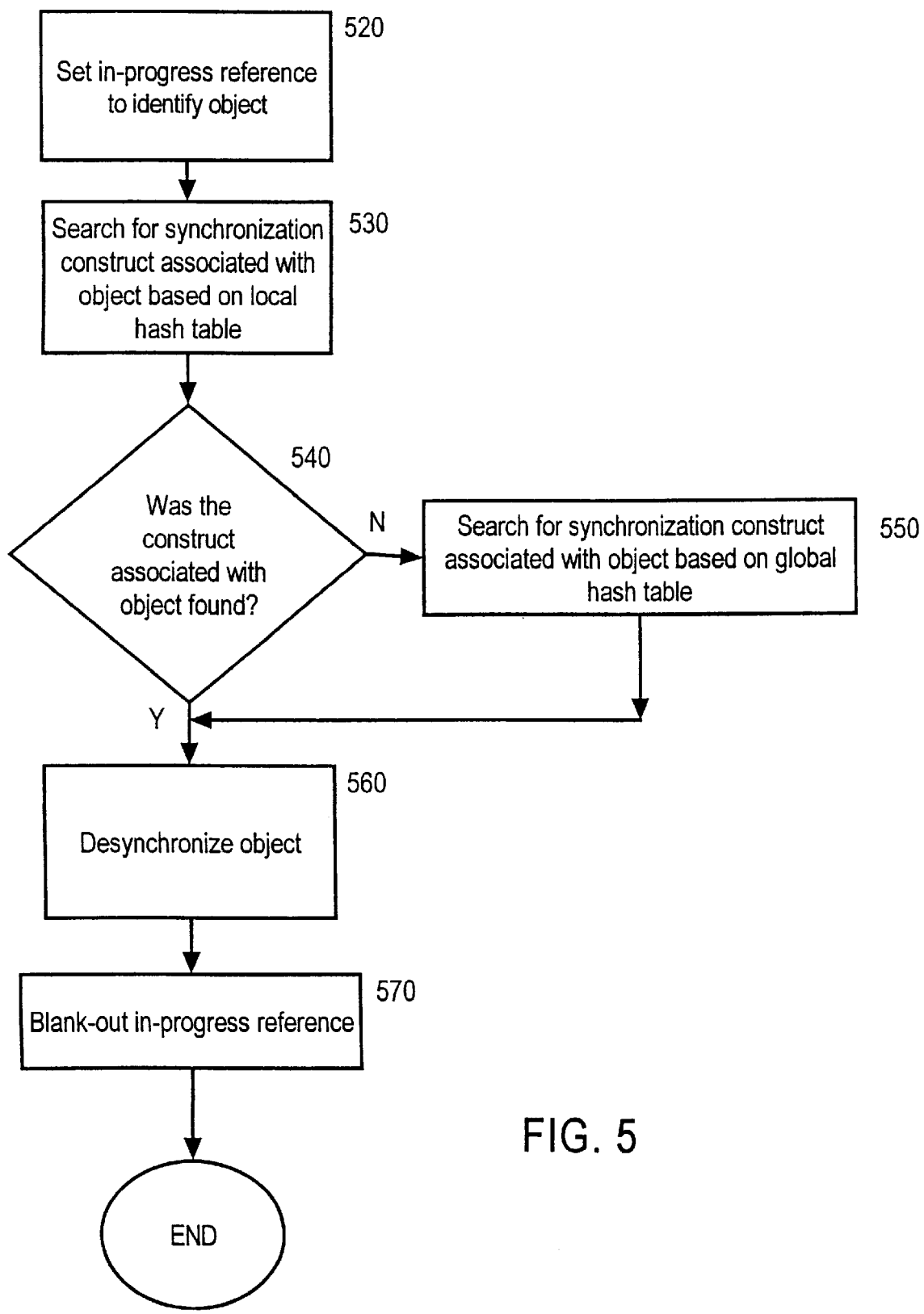
FIG. 5 is a flow chart showing steps performed when a thread requests desynchronization in accordance with an embodiment of the present invention.

Referring to FIG. 4, in step 410, the object synchronization module receives the request to synchronize with an object. The object with which synchronization is requested is herein referred to as the requested object. The thread requesting synchronization with the requested object is herein referred to as the requesting thread. In this example, a request is received from thread 216-T to synchronize with object 214-0.

In step 416, object synchronization module 300 sets the in-progress reference 360 to the unique ID of the requested object. By assigning a value identifying an object to the in-progress reference 360 before beginning to search for a synchronization construct associated with the requested object in step 422, the in-progress reference 360 indicates that the thread may have begun to access the synchronization construct associated with the identified object. In this example, the in-progress reference 360 is set to identify object 214-0.

In step 422, a search is begun to find the synchronization construct currently associated with the requested object, if any, using the local hash table 368. The cache manager 326 invokes the local hash table address generator 376 to generate the local hash table address to which the particular object's unique ID is mapped. The local hash table address generator 376 generates the local hash table address by computing the predetermined local hash function on the unique ID. The cache manager 326 then determines whether the pointer at the local hash table address to which the particular object's unique ID is mapped points to a synchronization construct associated with the particular object. The cache manager 326 makes this determination by accessing the synchronization construct pointed to by the pointer at the local hash table address to find the object identifier of the synchronization construct, and compares the object identifier to the unique ID of the particular object. If the object identifier matches the unique ID of the particular object, the synchronization construct pointed to by the pointer at the local hash table address is associated with the particular object.

In step 428, a determination is made of whether the cache manager 326 finds a synchronization construct currently associated with the requested object in step 422. If a synchronization construct is found, then control passes to step 470. Otherwise, control passes to step 430. In this example, the pointer at the local hash table address corresponding to object 214-0 points to a synchronization construct. The object identifier of this synchronization construct does not match the identity object 214-0. Therefore control passes to step 430.

In step 430, global hash table 328 is locked. Control passes to step 434.

In step 434, a search is performed to find the synchronization construct currently associated with the requested object, if any, based on the global hash table 328. Cache manager 326 generates the global hash table address to which the object's unique ID is mapped. It does so by computing the predetermined hash function on the unique ID. The cache manager 326 then locates the pointer in the pointers 324 that is at the generated global hash table address. Then cache manager 326 determines whether the chain of constructs pointed to by the located pointer, chain of constructs 380 in this example, contains a synchronization construct currently associated with the object 214-0. The cache manager 326 makes this determination by accessing each of the synchronization constructs in chain of constructs 380 to determine whether the object identifier 212 of the synchronization construct being accessed corresponds to object 214-0, stopping if the sought after object is found. If chain of constructs 380 does not contain a synchronization construct with an object identifier 212 matching the unique ID of object 214-0, as is the case in this example, then object 214-0 is not currently associated with any synchronization construct.

In step 440, a determination is made of whether the cache manager 326 finds a construct in step 434. If a synchronization construct is not found, then control passes to step 446.

Otherwise, control passes to step 450. In this example, because chain of constructs 380 does not contain a synchronization construct with an object identifier 212 identifying object 214-0, control passes to step 446.

In step 446, the object synchronization module 300 associates a synchronization construct 224-N that is taken from the free list 330 with the object 214-0.

The free list 330 is a singly-linked list of those of the synchronization constructs 224, in this case synchronization constructs 224-M to 202-N, that are not currently associated with an object. It comprises a free list header 320 with a pointer to free list 330. When a synchronization construct is taken from the free list 330 and associated with an object, the free list 330 is first locked, then updated to reflect that the synchronization construct is removed from free list 330 and added to the chain of constructs pointed to by the located pointer. The free list 330 is then unlocked. In associating a synchronization construct 224 from the free list 330 with object 214-0, the object identifier of object 214-0 is set to the unique ID of the object to uniquely identify the object.

In step 450, now that the operations specifically pertaining to associating a synchronization construct with object 214-0 are complete, the global hash table 328 may be unlocked. Control passes to step 456.

In step 456, the object synchronization module 300 sets the pointer at the local hash table address previously generated for the particular object to refer to the synchronization construct associated with the particular object. Note that the previous value of the pointer is overwritten. Control then passes to step 462.

In step 462, object synchronization module 300 sets the dirty flag 308 in the thread-local cache assigned to the requesting thread to indicate that the local hash table 368 has been modified (i.e. is dirty). Note, that in an embodiment of the present invention where there is not dirty flag in thread-local cache, this step may be omitted. Control then passes to step 470.

In step 470, object synchronization module 300 begins performance of the operations specific to synchronize object 214-0 with thread 216-T. These operations include determining whether the exemplary synchronizers list 210 of the synchronization construct associated with object 214-0 contains at least an entry for a thread. If there is no entry for a thread in exemplary synchronizers list 210, then object synchronization module 300 adds an entry for the requesting thread to the associated synchronization construct's exemplary synchronizers list. At this point the requested object is synchronized with the requesting thread.

In this example, there is no entry in the exemplary synchronizers list 210 for synchronization construct 224. Therefore, object 214-0 is added to the exemplary synchronizers list 210 of the synchronization construct 224. At this point, the requested object 214-0 is synchronized with the thread 216-T.

If, on the other hand, exemplary synchronizers list 210 contains an entry for a thread, and it is not thread 216-T, then an entry for the requesting thread is added to waiters list 218. In the future, the entry for the requesting thread will be removed from the waiters list 218 when it is later synchronized with the requested object in a manner which shall be described in more detail.

In step 476, the in-progress reference 360 is blanked out so that it does not match the unique ID of any object. Performance of the steps ends. The requesting thread begins execution of the synchronized method 200 of the requested object.

If the determination in step 428 is that a synchronization construct was found based on the local hash table 368, then a synchronization construct is already associated with the requested object. Thus, control passes to step 470.

De-Synchronization of Objects When Synchronization is Completed

Under certain conditions, synchronization with objects may "nest". Nesting of synchronization occurs when a thread invokes a synchronized method of an object with which it is already synchronized. For example, nesting will occur when a thread becomes synchronized with an object upon initially invoking a synchronized method of the object, and then subsequently invokes one or more synchronized methods of the same object before the execution of the previously invoked synchronized method is terminated.

Due to nesting, when one of threads 216 exits a synchronized method 200 of one of the objects 214, the synchronization of the object with the thread is not necessarily completed. An object remains synchronized with a thread until each of the subsequent invocations of the synchronized methods and the initial invocation is terminated. After all the thread's invocations of the synchronized methods of the object are terminated, the object may become "de-synchronized" with respect to the thread. Regardless of whether nesting has occurred, the object and its associated synchronization construct remain associated if the synchronization construct is still in-use.

If not in-use, the association may be terminated immediately (i.e. eagerly) upon de-synchronization, or the termination may be delayed (i.e., lazily) until performed by, for example, garbage collection. When synchronization with an object is complete, the thread invokes the object synchronization module 300 to instruct the cache manager 326 that the thread is requesting to de-synchronize with the object whose synchronized method the requesting thread is exiting. The thread requesting de-synchronization is referred to as the requesting thread. The object with which the requesting thread requests de-synchronization is referred to as the retested object.

Assume for example, thread 216-1 is synchronized with object 214-1, and is exiting a synchronized method 200 of object 214-1 when thread 216-1 invokes object synchronization module 300 and instructs object synchronization module 300 that thread 216-1 requests de-synchronization with object 214-1. Object synchronization module 300 receives the request from thread 216-1 that thread 216-1 requests de-synchronization with object 214-1.

In step 520, object synchronization module 300 sets the in-progress reference 360 to the unique ID of the object with which de-synchronization is requested. In this example, the in-progress reference 360 is set to identify object 214-1.

In step 530, a search is performed for the synchronization construct currently associated with the requested object using the local hash table 368. The cache manager 326 invokes the local hash table address generator 376 to generate the local hash table address to which the particular object's unique ID is mapped. The local hash table address generator 376 generates the local hash table address by computing the predetermined local hash function on the unique ID. The cache manager 326 uses the pointer at the local hash table address mapped to the requested object's unique ID to access the synchronization construct pointed by the pointer. Then cache manager 326 determines whether the synchronization construct pointed to by the pointer is associated with the requested object by comparing the object identifier of the synchronization construct to the unique ID of the requested object.

In step 540, a determination is made of whether a synchronization construct associated the requested object was found using the local hash table 368. If the object identifier of the synchronization construct accessed in step 530 matches the identity of the requested object, then the synchronization construct associated with the requested object was found. Execution of the steps proceeds to step 560. Otherwise, control passes to step 550.

In this example, the pointer at the local hash table address mapped to object's 214-1 memory address does not point to the synchronization construct associated with object 214-1. Therefore, a synchronization construct associated with the object was not found. Control passes to step 550.

In step 550, cache manager 326 falls back to the global hash table 328 to find the synchronization construct associated with the requested object in the same manner previously described for step 430, step 434, step 450, step 456, and step 462.

In this example, cache manager 326 locks global hash table 328. Cache manager 326 then generates a global hash table address based on object's 214-1 unique ID, uses the pointer at this global hash table address to access the chain of constructs that contains the synchronization construct used to synchronize object 214-1. The unique ID of object 214-1 maps to pointer 324-1, which points to construct 224-1, the synchronization construct associated object 214-1. Next, global hash table 328 is unlocked.

In step 560, object synchronization module 300 performs operations specific to de-synchronizing the requesting thread from the requested object. These operations include removing the thread from the exemplary synchronizers list 210 of the synchronization construct associated with the requested object. In this example, thread 216-1 is removed from the exemplary synchronizers list 210 of synchronization construct 224-1.

If there is an entry for a thread on the waiters list 218 of the synchronization construct, the entry for the thread is removed and an entry for this thread is added to the exemplary synchronizers list 210. The thread with the entry just added to the exemplary synchronizers list may then begin execution of the synchronized method of the requested object. Note that after de-synchronization, a synchronization construct remains associated with its respective object.

In this example, the waiters list 218 of object 214-1 is examined to determine whether it contains a thread awaiting synchronization. No thread is on the waiters list 218 of object 214-1, so control passes to step 570.

In step 570, the in-progress reference 360 is blanked-out so that it no longer identifies any object. Performance of the steps ends.

Garbage Collection

Garbage collection is a mechanism by which synchronization constructs that are currently associated with objects, but have met termination criteria, may be made available for association with another object. When a synchronization construct's association with an object is terminated, the synchronization construct is removed from its respective chain of constructs and moved to the free list. A synchronization construct being removed from a chain of constructs and moved to the free list after the synchronization construct's association with an object is terminated is referred to as being freed. The local hash table 368 of each thread is maintained so that the local hash 328 is consistent with the global data structures of object synchronization module 300.

A thread's local view of the state of the global data structures is based on the local data structures that are part of a thread's thread-local cache. As mentioned earlier, because the unique ID of two or more objects can hash to the same local hash table address, a pointer to a first synchronization construct at a local hash table address may be overwritten when adding a pointer to a second synchronization construct to the local hash table as the same hash table address. This overwriting is one reason that the view maintained in the local hash table of the global data structures is partial.

Although the view maintained through the local hash table is partial, the view is kept consistent by coordinating the view maintained in local hash table with the synchronization cache in the manner described herein. When a synchronization construct is referred to by the pointer at a local hash table address, the actions of the garbage collector guarantee that the synchronization construct is indeed associated with an object and is not free. If the synchronization construct's association with an object is terminated, all references to the synchronization construct in any local hash table are deleted.

Note that a correct view of the global data structures is maintained when a pointer in local hash table 368 is set to not point to any synchronization construct. Setting a pointer to not point to any synchronization construct will cause the cache manager to fall back to using global hash table 328 to access a synchronization construct.

Figure 6:
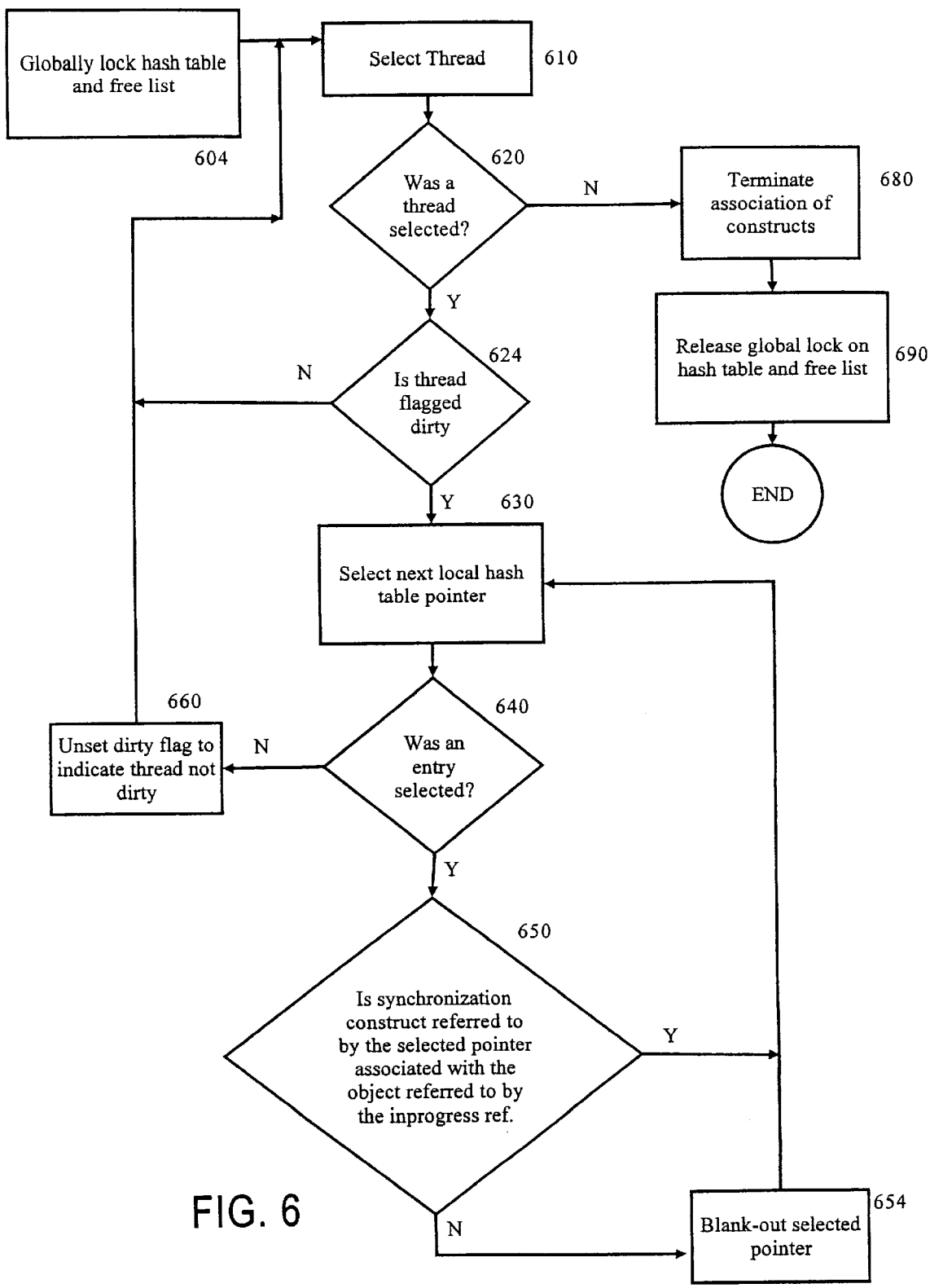
FIG. 6 is a flow chart showing the steps of a method for performing garbage collection of synchronization constructs in accordance with an embodiment of the present invention.

One method for performing garbage collection when the thread-local cache of a thread is to used to access synchronization constructs in the manner previously described is shown in FIG. 6. To aid in describing the steps show in FIG. 6, assume for example local hash table 368 shown in FIG. 3 is part of a local thread cache assigned to thread 216-1. Pointer 364-1 in local hash table 368 refers to construct 224-1 and pointer 364-2 refers to construct 224-2. Construct 224-1 is associated with object 214-1 and construct 224-2 is associated with object 214-2. Object 214-1 is not synchronized with any thread and object 214-2 is synchronized with thread 216-2. The in-progress reference of thread 216-1 is set to identify object 214-1. Immediately after setting the in-progress reference of thread 216-1, the execution of thread 216-1 was suspended when garbage collector 327 is invoked as described below.

Referring to FIG. 6, garbage collector 327 is invoked by object synchronization module 300 in response to object synchronization module 300 detecting a terminating enabling condition. A terminating enabling condition may include, for example, the free list 330 containing less than a threshold number of synchronization constructs. When this condition occurs, the object synchronization module 300 then invokes garbage collector 327 to free up synchronization constructs which are currently associated with objects, but that meet termination criteria, in a manner which shall be described.

While one termination enabling condition has been described above, various alternative conditions occur. Therefore, it is understood that the present invention is not limited to any specific termination enabling condition.

Referring to FIG. 6, in step 604, the garbage collector 327 globally locks free list 330 and global hash table 328. In step 610, garbage collector 327 then selects a thread by iterating through the entries in the list of current threads 216. Control passes to step 620. In this example, thread 216-1 is selected, thus control passes to step 620.

In step 620, garbage collector 327 then determines whether a thread was selected. If a thread was selected, control passes to step 624. If a thread was not selected, then each thread as been iterated through, and control passes to step 680.

In step 680, the garbage collector then terminates the association of objects with synchronization constructs that meet termination criteria. The termination of the association of synchronization constructs with objects is performed in a manner which shall be described in further detail.

In step 624, the garbage collector 327 then determines whether the thread has been flagged as dirty. If the thread has not been flagged as dirty, then the selected thread has not modified its local hash table (e.g. by entering a new pointer to a synchronization construct) since the last invocation of garbage collector 327. Therefore, there is no new pointer for which the garbage collector to set to not point, and the thread-local cache for this particular thread may thus be ignored. Garbage collector 327 determines whether a thread has been flagged as dirty by accessing the dirty flag 308 using the thread-local cache pointer contained in the entry associated with the selected thread, and then examining the value stored in the dirty flag 308. If the dirty flag 308 is set to a value indicating that that the thread is not dirty, control passes to step 610 where the garbage collector 327 selects another thread, if any.

In this example assume the dirty flag 308 that is part of the thread-local cache assigned to thread 216-1 is set to a value indicating the thread is dirty. If the determination made is that the selected thread is dirty, as is the case in this example, then control passes to step 630.

In step 630, garbage collector 327 accesses the local hash table to select the next non-null pointer ("next pointer") in local hash table 368 of the selected thread starting with the pointer at the first local hash table address. Control passes to step 640. In this example, the next pointer selected is pointer 364-1.

In step 640, the garbage collector 327 determines whether a pointer was selected from the local hash table 368. If none was selected, then garbage collector 327 has iterated through all the pointers and control passes to step 660.

In step 660, the garbage collector 327 unsets dirty flag 362 to a value indicating that the thread is not dirty. Control passes to step 610 where another thread is selected, if any.

If garbage collector 327 determines that a next pointer in local hash table 368 was selected, as is the case in this example, then control passes to step 650.

In step 650, garbage collector 327 determines whether the synchronization construct pointed to by the selected pointer is associated with the same object identified by in-progress reference 360. If the synchronization construct pointed to by the selected pointer is not associated with the same object identified by in-progress reference 360, then control passes to step 654.

In step 654, garbage collector 327 blanks out the selected pointer to not point to a synchronization construct. Control returns to step 630.

If the on other hand, at step 650, it is determined that the synchronization construct pointed to by the selected pointer is associated with the same object identified by in-progress reference 360, then the selected thread could be in the process of accessing the synchronization construct The in-progress reference is used to protect the integrity of the thread-local cache in the face of a race condition between two threads, one attempting to look up a synchronization construct, and another attempting to garbage collect the synchronization construct. This condition could occur in the way described below. The criterion that no in-progress reference associated with any thread be set to identify the object associated with a synchronization is included in termination criteria for that synchronization construct.

To illustrate one way the use of the in-progress reference protects the integrity of the thread-local cache in the face of a race condition, assume the selected thread is requesting synchronization with an object, and that the selected thread has determined that a synchronization construct referred to by a pointer in the local hash table is associated with the object. After this determination is made but before the thread has been able to synchronize with the object and establish itself as an owner, or establish itself as a waiter, the execution of the selected thread may be suspended by computer system 100, as occurs in multithreaded environments, in order to permit another thread to execute. The other thread could experience a termination enabling condition and then invoke the garbage collector 327, which, except for the fact the termination criteria is now based on the in-progress reference, may terminate the association of the synchronization construct with the object. The garbage collector would have done so because it had determined that, except for the in-progress reference being set to refer to the object, the synchronization construct meets the termination criteria. When the selected thread begins to execute again, it would operate under the erroneous view that the synchronization construct is still associated with the identified object, despite the fact the synchronization construct might now be free or associated with some other object.

At step 650, in this example, construct 224-1 is the synchronization construct pointed to by the next pointer, pointer 364-1. Construct 224-1 is associated with object 214-1, the object identified by in the in-progress reference 360. Then control then passes to step 630.

In step 630, in this example, pointer 364-2 is selected as the next pointer. In step 650, construct 224-2 is the synchronization construct pointed to by the next pointer, pointer 364-2. Construct 224-2 is associated with object 214-2, an object not identified by the in-progress reference 360. Thus control passes to step 654.

In step 654, garbage collector 327 blanks out the selected pointer, pointer 364-2, to not point to a synchronization construct. Control passes to step 630.

Assume that every thread has been iterated through and control has passed to step 680. In step 680, each entry in each chain of constructs is iterated through, and for each synchronization construct, a determination is made of whether association termination criteria has been met. In one embodiment of the invention, association termination criteria include a condition in which no thread is synchronized with the object associated with the synchronization construct, no thread is waiting for synchronization with the object, and that no in-progress reference associated with any thread be set to identify the object.

Whether any object is synchronized is determined by examining the exemplary synchronizers list 210 of the selected synchronization construct. If the exemplary synchronizers list 210 contains an entry for a thread, then the object to which the synchronization construct is associated is synchronized with a thread.

If, however, the respective exemplary synchronizers list 210 contains no thread, then the object to which the exemplary synchronizers list belongs is not synchronized with any thread. Next, it is then determined whether any thread is waiting for synchronization with the object. Whether a thread is waiting for synchronization is determined by examining the waiters list 218. If the list contains an entry for at least one thread, then there is a thread waiting for synchronization with the object.

While one condition that termination criteria can include has been described, termination criteria can include, in place or in addition to the one condition just described, other conditions. Therefore, it is understood that the present invention is not limited to the inclusion of any specific condition in termination criteria.

As mentioned earlier, the synchronization construct being inspected is construct 224-2. An entry for thread 216-2 is on the exemplary synchronizers list 210 for construct 224-2. Thus association between object 214-2 and construct 224-2 is not terminated.

After all the synchronization constructs have been iterated through, control passes to step 690. In step 690, the garbage collector releases its global lock on global hash table 328 and free list 330 (step 690 in FIG. 6). Performance of the steps ceases.

Note that unless the local hash table pointer to a synchronization construct refers to the synchronization construct associated with the object referred to by the in-progress reference, the pointer is blanked out, without regard to whether the synchronization construct's association with an object is terminated by the garbage collector (i.e. does or does not meet association termination criteria). The present invention is not limited to methods which blank out a particular pointer at a local hash table address without regard to whether the synchronization construct referred to by the particular pointer will be freed by the garbage collector.

One alternative approach, the "selective" approach, involves blanking out only pointers in the local hash table that point to synchronization constructs that will be freed. By retaining the pointers that point to synchronization constructs that will not be freed, falling back to the global hash table occurs less often. The selective approach entails making a determination, when blanking out the local hash table pointers, of which synchronization constructs will be freed by the garbage collector. In circumstances where making this determination is less expensive in terms of computer resources than falling back to the global hash table more often, it may be desirable to use the "selective method".

While one method of managing hash table collisions for the local hash table have been described, various alternative hash table collision mechanisms are possible. Therefore, it is understood that the present invention is not limited to any specific hash table collision mechanism. For example, a local chain of constructs can be maintained for each local hash table address in a manner similar to that described for the global hash table, except that the local chain of constructs would be limited to a pre-determined number of elements. Even when the number of elements in the local chain of constructs is limited, falling back to the global hash table will nevertheless occur less often. It may be desirable to use local chains of constructs if maintaining the local chains of constructs requires less computer resources than falling back to the global hash table more often.

In other embodiments, the methods for accessing a synchronization construct using thread-local cache in the course of synchronizing or desynchronizing are applied to other operations where the need to access a synchronization construct arises. For example, when the synchronization construct is a monitor, wait and notify operations are performed on the synchronization construct. The determination of which synchronization construct is associated with the concerned object are performed in manner similar to that described for synchronizing and desynchronizing.

Additional Features And Alternative Embodiments

One embodiment of the invention has been described as utilizing synchronization constructs 224 for synchronizing objects 214 with threads 216. These synchronization constructs may be well known synchronization constructs such as mutexes, monitors, and semaphores.

In the case where the synchronization constructs 224 are mutexes, the mutexes may simply operate in the way described earlier without any additional synchronization features. Moreover, the predefined number of threads 216 that can be synchronized with one of the objects 214 at a time may be one. Moreover, there may also be any number of threads waiting for synchronization.

However, when the synchronization constructs 224 are monitors, they may additionally include a condition variable waiters list (not to be confused with exemplary waiters list 218). The condition variable waiters list of a monitor contains those of the threads 216 that have ceased their synchronization with the object that has its synchronization monitored by the monitor, pending some condition being true. When the waiting thread is notified by another thread, the waiting thread is unsuspended. Then the thread first reacquires the monitor lock, and normally rechecks whether the condition is true. Note that the association termination criteria for synchronization constructs that are monitors would include that no object be on the condition variable waiters list.

In the case where the synchronization constructs 224 are semaphores, the predefined number of threads 216 that may be synchronized with one of the objects 214 at one time may be some positive number N. As a result, up to N threads may be listed in the exemplary synchronizers list 210 representing the N threads on which the object is currently synchronized.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of synchronizing an object with a thread, the method comprising the steps of:

searching a local data structure for reference data referring to a specific synchronization construct that is associated with said object, said local data structure being a data structure that is part of a thread-local cache assigned to said thread; and if said local data structure does not contain said reference data referring to said specific synchronization construct, then searching for said specific synchronization construct using a global data structure, said global data structure containing data associating objects with synchronization constructs.

2. The method of claim 1, further including the step of setting an in-progress reference to indicate an identity of said object when searching said local data structure.

3. The method of claim 2, further including the step of preventing a termination of an association between said object and said specific synchronization construct when said in-progress reference identifies said object.

4. The method of claim 1, further including the steps of:

terminating associations of particular objects with particular synchronization constructs associated with said particular objects; and in response to terminating associations of particular objects, setting said reference data to not refer to any synchronization construct.

5. The method of claim 1, further includes, in response to detecting a termination enabling condition, performing the steps of:

terminating associations of particular objects with particular synchronization constructs associated with said particular objects; and in response to determining said local data structure has been modified since most previously performing the step of terminating the associations of said particular objects with said particular synchronization constructs associated with said particular objects, then setting data in said local data structure to not refer to any synchronization construct.

6. The method of claim 5, further including the step of determining whether said local data structure has been modified by detecting that a dirty flag associated with said thread indicates that the local data structure has not been modified.

7. The method of claim 1, wherein:

the method further includes the step of applying data identifying said object to a hash function to produce a hash value; and the step of searching said local data structure includes using said hash value to search for the reference data referring to said specific synchronization construct in a local hash table.

8. The method of claim 1, wherein:

the method further includes the step of applying data identifying said object to a hash function to produce a hash value; and the step of searching said local data structure includes using said hash value to find said reference data in said local data structure to access a particular synchronization construct.

9. The method of claim 8, wherein:

said particular synchronization construct contains data identifying an object with which said particular synchronization construct is associated; and the method further includes the step of determining whether said reference data in said local table refers to said specific synchronization construct by determining whether said data identifying the object with which said particular synchronization construct is associated identifies said object.

10. A computer-readable medium carrying one or more sequences of one or more instructions for synchronizing an object with a thread, wherein the execution of the one or more sequences of the one or more instructions causes the one or more processors to perform the steps of:

searching a local data structure for reference data referring to a specific synchronization construct that is associated with said object, said local data structure being a data structure that is part of a thread-local cache assigned to said thread; and if said local data structure does not contain said reference data referring to said specific synchronization construct, then searching for said specific synchronization construct using a global data structure, said global data structure containing data associating objects with synchronization constructs.

11. The computer-readable medium of claim 10, wherein the one or more sequences of instructions includes one or more instructions for performing the step of setting an in-progress reference to indicate an identity of said object when searching said local data structure.

12. The computer-readable medium of claim 11, wherein the one or more sequences of instructions includes one or more instructions for performing the step of preventing a termination of an association between said object and said specific synchronization construct when said in-progress reference identifies said object.

13. The computer-readable medium of claim 10, wherein the one or more sequences of instructions includes one or more instructions for performing the steps of:

terminating associations of particular objects with particular synchronization constructs associated with said particular objects; and in response to terminating associations of particular objects, setting said reference data to not refer to any synchronization construct.

14. The computer-readable medium of claim 10, wherein the one or more sequences of instructions includes one or more instructions for performing the steps of:

terminating associations of particular objects with particular synchronization constructs associated with said particular objects; and in response to determining said local data structure has been modified since most previously performing the step of terminating the associations of said particular objects with said particular synchronization constructs associated with said particular objects, then setting data in said local data structure to not refer to any synchronization construct.

15. The computer-readable medium of claim 14, wherein the one or more sequences of instructions includes one or more instructions for performing the step of determining whether said local data structure has been modified by detecting that a dirty flag associated with said thread indicates that the local data structure has not been modified.

16. The computer-readable medium of claim 10, wherein:

the one or more sequences of instructions includes one or more instructions for performing the step of applying data identifying said object to a hash function to produce a hash value; and the step of searching said local data structure includes using said hash value to search for the reference data referring to said specific synchronization construct in a local hash table.

17. The computer-readable medium of claim 10, wherein:

the one or more sequences of instructions includes one or more instructions for performing the steps of applying data identifying said object to a hash function to produce a hash value; and the step of searching said local data structure includes using said hash value to find said reference data in said local data structure to access a particular synchronization construct.

18. The computer-readable medium of claim 17, wherein:

said particular synchronization construct contains data identifying an object with which said particular synchronization construct is associated; and the one or more sequences of instructions includes one or more instructions for performing the step of determining whether said reference data in said local table refers to said specific synchronization construct by determining whether said data identifying the object with which said particular synchronization construct is associated identifies said object.

19. A computer system comprising:

a processor;

a memory coupled to said processor;

a cache of synchronization constructs stored in said memory;

a global data structure stored in said memory, said global data structure containing data associating objects with synchronization constructs associated with said objects;

a thread-local cache stored in said memory, said thread-local cache being assigned to a thread;

a local data structure stored as part of said thread-local cache;

said processor configured to search said local data structure for reference data referring to a specific synchronization construct associated with an object; and said processor configured to search, if said local data structure does not contain reference data referring to said specific synchronization construct, for said specific synchronization construct using said global data structure.

20. The computer system of claim 19, further comprising:

said processor configured to terminate associations of particular objects with particular synchronization constructs associated with said particular objects; and said processor configured to setting data in said local data structure to not refer to any synchronization construct.

* * * * *